United States Patent [19]
Budai et al.

[11] Patent Number: 5,221,673
[45] Date of Patent: Jun. 22, 1993

[54] FODDER COMPOSITIONS

[75] Inventors: Zoltán Budai; Tibor Mezei; Klára Reiter née Esses; Lajos Fekete; Károly Magyar; Attila Nagy; László Puskás, all of Budapest, Hungary

[73] Assignee: Egis Gyogyszergyar, Hungary

[21] Appl. No.: 802,235

[22] Filed: Dec. 4, 1991

[30] Foreign Application Priority Data

Dec. 22, 1990 [HU] Hungary .............................. 8448/90

[51] Int. Cl.$^5$ .......................................... A61K 31/535
[52] U.S. Cl. .................................................. 514/237.5
[58] Field of Search ..................................... 514/237.5

[56] References Cited

FOREIGN PATENT DOCUMENTS 087053 7/1979 Japan .
087054 7/1979 Japan .
56-12316 2/1981 Japan .

OTHER PUBLICATIONS

Chemical Abstracts (94:208496g) 1981.
C. Farina, et al., "New antisecretory and antiulcer alkoxythiobenzamides. II", Jan.-Feb. 1979, pp. 27-31, vol. 14, No. 1 Eur. J. Med. Chem.-Chimica Therapeutica.
G. Musumarra et al., "Qualitative Organic Analysis. Part 2. . . ." Jul./Aug. 1987, vol. 11, pp. 154-163; Journal of Analytical Toxicology.
Y. Tominaga et al., "Polarized Ethylenes. IV . . . " Mar.-Apr. 1990, pp. 647-660, vol. 27 J. Heterocyclic Chem (1990).

Primary Examiner—Frederick E. Waddell
Assistant Examiner—K. Weddington
Attorney, Agent, or Firm—Beveridge, DeGrandi, Weilacher & Young

[57] ABSTRACT

This invention relates to fodder compositions, particularly feed additives, premixes and ready-for-use fodders, and a method for increasing weight-gain and improving fodder utilization of dimestic animals.

The compositions according to the invention comprise as active ingredient a compound of the general formula (I),

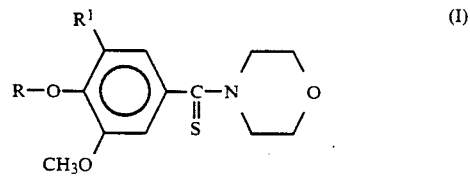

wherein
$R^1$ represents methoxy or hydrogen and
R stands for methyl; or
R and $R^1$ each denotes hydrogen; or
$R^1$ stands for hydrogen and R represents ethyl.

The compounds of the general formula (I) known from the literature exhibit useful weight-gain increasing and fodder-utilization improving effects and can be used in animal husbandry.

22 Claims, No Drawings

FODDER COMPOSITIONS

This invention relates to fodder compositions, particularly feed additives, premixes and ready-for-use fodders, and a method for increasing weight-gain and improving fodder utilization of domestic animals.

It is known that the compounds of the general formula (I),

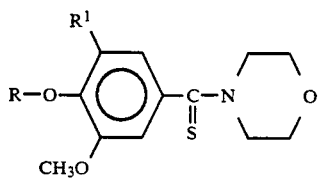

wherein
$R^1$ represents methoxy or hydrogen, and
R stands for methyl; or
R and $R^1$ each denotes hydrogen; or
$R^1$ stands for hydrogen and R represents ethyl, posses choleretic and ulcus-secretion inhibiting properites [Jpn. Kokai Tokkyo Koho: 8112.315; Eur. J. Med. Chem.-Chim. Ther. 14, 27-31 (1979)].

Now it has been found that the compounds of the formulae (V), (VI), (VII) and (VIII)

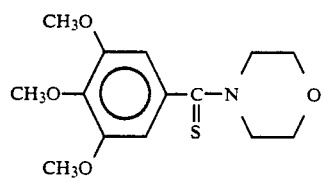

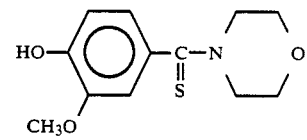

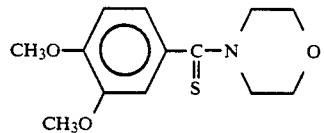

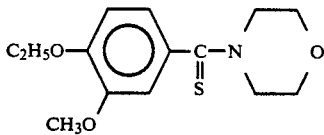

falling under the general formula (I) possess valuable weight-gain increasing and fodder-utilization improving effects and can be used in animal husbandry.

According to an aspect of the present invention there are provided compositions, particularly fodder additives, premixes and ready-for-use fodders, comprising as active ingredient an amount of 0.0001 to 85% by weight of a compound of the general formula (I), wherein R and $R^1$ are as stated above, with suitable edible solid or liquid carriers or diluents and optionally with additives generally used in the production of fodder additives or fodders.

The active ingredients of the general Formula (I) encompass the following compounds:
4-(4'-hydroxy-3'-methoxyphenyl)-trioxomethylmorpholine [compound of formula (VI)],
4-(3',4',-dimethoxyphenyl)-thioxomethylmorpholine [compound of formula (VII),]
4-(3,',4',5'-trimethoxyphenyl)-thioxomethylmorpholine [compound of formula (V)],
4-(4'-ethoxy-3'-methoxyphenyl)-thioxomethylmorpholine [compound of formula (VIII)].

The known active ingredients of the general formula (I) can be prepared by the following methods:
a) reacting an aldehyde of the general formula (II)

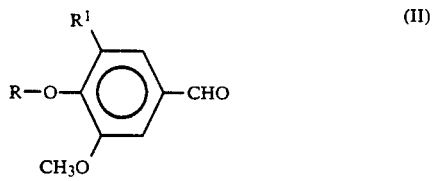

wherein R and $R^1$ are as stated above—with morpholine and sulfur; or
b) reacting a benzoic acid of the general formula (III)

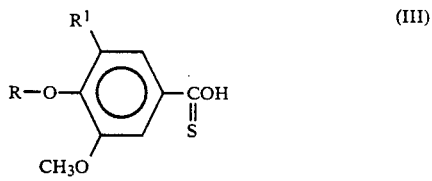

wherein R and $R^1$ are as stated above—or a reactive derivative thereof with morpholine; or
c) thionating an oxo compound of the general formula (IV)

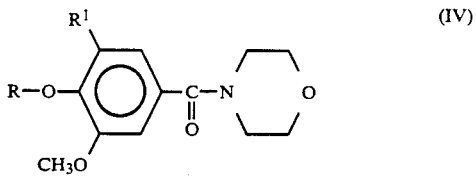

wherein R and $R^1$ are as stated above—with diphosphorus pentasulfide;
and, if desired, methylating or ethylating the hydroxy group of a compound of the general formula (I) thus obtained, wherein R represents hydrogen.

The above reactions are known from the literature [e.g. EUR. J. Med. Chem.-Chim. Ther. 14, 27-31 (1979)].

The weight-gain increasing and fodder-utilization improving effects of the compounds of the general formula (I) are shown by the following test:

Pigs are used as test animals. Each animal group consists of 6 pigs and each test with 6 pigs is repeated 3 times. The fodder contains 50 mg/kg of the test compound of the general formula (I). The animals are fed under identical conditions and all the animal groups receive the same amount of fodder having the same composition. The animals of the reference group are fed with the same fodder except that the fodder contains Flavomycine instead of the compound of the general formula.(I). The animals of the control group receive a fodder to which neither a test compound of the general formula (I) nor Flavomycine is added. The test results thus obtained are summarized in Table (I).

TABLE I

| Test compound | Average daily weight-gain related to the control | Amount of fodder required to obtain 1 kg of weight-gain, related to the control |
| --- | --- | --- |
| Example 2 | 126% | 85% |
| Flavomycine | 114% | 96% |
| Control | 100% | 100% |

From the above data it can be seen that the weight gain of the animals fed with a fodder containing a compound of the general formula (I) is significantly higher than that of the pigs of the reference group. At the same time the same weight gain can be achieved with a considerably smaller amount of fodder when a compound of the formula (I) is incorporated to the animal feed. This is a proof of an improved fodder utilization.

According to a further aspect of the invention there is provided a process for the preparation of fodder additives, premixes and ready-for-use fodders, which comprises admixing a compound of the general formula (I), wherein R and $R^1$ are as stated above, with suitable edible solid or liquid carriers or diluents and optionally with additives generally used in the production of fodder additives and fodders.

As carrier any substance of vegetable or animal origin applicable in the feeding of animals can be used. For this purpose e.g. wheat, barley, bran, maize, soybean, oats, rye, alfalfa can be used in appropriate forms (grits, groats, meal etc.), furthermore fish meal, meat meal, skimmed milk powder or tapioca meal etc. or mixtures thereof can be used as well. One may advantageously use a fiber-free green plant fodder concentrate with high protein content.

As additives e.g. silicic acid, antioxidants, starch, dicalcium phosphate, calcium carbonate, sobic acid etc. can be used. Various alkylene glycols can also be used for this purpose. The starch used may be wheat, maize or potato starch.

The active agent content of the compositions may vary within wide ranges. The fodder additives and concentrates may contain about 5 to 80% by weight, preferably about 10 to 80% by weight, of the active ingredient of the formula (I). The active ingredient content of the animal fodders ready-for use may be about 0.001 to 0.04% by weight, preferably about 0.001 to 0.01% by weight, The fodder additives and concentrates may contain usual vitamins (e.g. vitamin A, $B_1$, $B_2$, $B_3$, $B_6$, $B_{12}$, E, K) and trace elements (e.g. Mn, Fe, Zn, Cu, I), too.

The fodder additives and concentrates are diluted with suitable fodder components or are incorporated into suitable animal feeds to provide animal feeds ready for use.

The fodder additives, premixes and ready-for-use fodders according to the present invention can be used for increasing the weight-gain and improving feed utilization of various domestic animals such as pigs, lambs, cattle, poultry, particularly pigs.

According to a further aspect of the present invention there is provided a method for improving weight-gain and fodder utilization of animals, which comprises feeding the animals with a fodder or feed additive according to the present invention.

According to a still further aspect of the present invention there is provided the use of the compounds of the general formula (I) for the increase of weight-gain and improvement of feed utilization of domestic animals.

The invention is further illustrated by the following non-limiting Examples. The melting points appearing in the Examples are not corrected.

EXAMPLE 1

4-(4'-Hydroxy-3'-methoxyphenyl)-thioxomethylmorpholine 104.5 g (1.5 mole) of morpholine, 32.0 g (1.0 mole) of powdered sulfur and 152.2 g (1.0 mole) of 4-hydroxy-3-methoxy-benzaldehyde are reacted at the boiling point of the reaction mixture (115 ° C.) for 4 hours. The product is crystallized from ethanol.

Yield: 226.8 g (89.5%) of yellow crystals.
M.p.: 167°–168 ° C.
Analysis for the formula $C_{12}H_{15}NO_3S$ (253.4): calculated: C %=56.87 H %=5.97 N %=5.56 S %=12.65. found: C %=57.02 H %=6.05 N %=5.49 S %=12,66.
UV: $\lambda max=281$ nm (=15442).

EXAMPLE 2

4-(4'-Ethoxy-3'-methoxyphenyl)-thioxomethylmorpholine 87.1 g (1.0 mole) of morpholine, 17.6 g (0.55 mole) of powdered sulfur and 90.1 g (0.5 mole) of 4-ethoxy-3-methoxy-benzaldehyde are reacted at the boiling point of the reaction mixture. When the aldehyde component can no longer be detected, the dark red oil is cooled and the product is crystallized from methanol.

Yield: 134.4 (95.5%) of yellow lamellated crystals.
M.p.: 127°–129 ° C.
Analysis for the formula $C_{14}H_{19}NO_3S$ (281.4): calculated: C %=59.75 H %=6.81 N %=4.98 S %=11.39. found: C %=59.46 H %=6.75 N %=5.07 S %=11.45.
UV $\lambda max=281$ nm (=15232).

EXAMPLE 3

4-(3',4',5'-Trimethoxyphenyl)-thioxomethylmorpholine 28.1 g (0.1 mole) of 4-(3',4',5'-trimethoxyphenyl)-oxomethylmorpholine, 100 ml of pyridine and 22.3 g (0.1 mole) of phosphorus pentasulfide are reacted at the boiling point of the reaction mixture for 5 hours. Then the solvent is distilled off and the product is precipitated with water.

Yield: 25.9 g (87.5%) of yellow crystals.
M.p.: 140°–142 ° C.
Analysis for the formula $C_{14}H_{19}NO_4S$ (297.3): calculated: C %=56.55 H %=6.44 N %=4.71 S %=10.78. found: C %=56.69 H %=6.40 N %=4.72 S %=10.65.
UV $\lambda_{max}=245$ and 280 nm (=8810 and 13434).

EXAMPLE 4

4-(3',4'-Dimethoxyphenyl)-thioxomethylmorpholine

A mixture of 25.1 g (0.1 mole) of 4-(3',4'-dimethoxyphenyl)-oxomethylmorpholine, 100 ml of pyridine and 22.3 g (0.1 mole) of diphosphorus pentasulfide is boiled for 8 hours. Then the solvent is removed in vacuo, the residue is poured into 300 g of icy water and the product is crystallized from ethanol.

Yield: 23.79 g (89.0%) of yellow crystals.

Analysis for the formula $C_{13}H_{17}NO_3S$ (267.37): calculated: C %=58.4 H %=6.41 N %=5.24 S %=11.99. found: C %=58.27 H %=6.47 N %=5.32 S %=12, 17.

EXAMPLE 5

A premix for supplementing piglet fodder is prepared with the following composition:

| Components | Amounts |
| --- | --- |
| Vitamin A | 3 000 000 NE |
| Vitamin $D_3$ | 600 000 NE |
| Vitamin E | 4 000 NE |
| Vitamin $K_3$ | 400 mg |
| Vitamin $B_1$ | 600 mg |
| Vitamin $B_2$ | 800 mg |
| Vitamin $B_3$ | 2 000 mg |
| Vitamin $B_6$ | 800 mg |
| Vitamin $B_{12}$ | 10 mg |
| Niacine | 4 000 mg |
| Choline chloride | 60 000 mg |
| Active agent according to Example 4 | 10 000 mg |
| Butylhydroxytoluene (antioxidant) | 30 000 mg |
| Flavouring substances | 8 000 mg |
| Sodium saccharate | 30 000 mg |
| Trace elements: | |
| Mn | 8 000 mg |
| Fe | 30 000 mg |
| Zn | 20 000 mg |
| Cu | 6 000 mg |
| I | 1 000 mg |
| Twice-ground bran ad | 1 000 g |

This premix of vitamins and trace elements is admixed with the basal fodder according to example 7 or 8 in a concentration of 0.5 kg per 100 kg.

EXAMPLE 6

A premix for supplementing piglet fodder is prepared with the following composition:

| Components | Amounts |
| --- | --- |
| Vitamin A | 1 200 000 NE |
| Vitamin $D_3$ | 300 000 NE |
| Vitamin E | 2 000 NE |
| Vitamin $B_2$ | 600 NE |
| Vitamin $B_3$ | 2 000 NE |
| Vitamin $B_{12}$ | 5 mg |
| Niacine | 3 000 mg |
| Choline chloride | 40 000 mg |
| Active agent according to Example 4 | 10 000 mg |
| Butylhydroxytoluene (antioxidant) | 30 000 mg |
| Trace elements: | |
| Mn | 6 000 mg |
| Fe | 10 000 mg |
| Zn | 15 000 mg |
| Cu | 30 000 mg |
| I | 100 mg |
| Twice-ground bran ad | 1 000 g |

This premix of vitamins and trace elements is admixed with the basal fodder according to example 7 or 8 in a concentration of 0.5 kg/100 kg.

EXAMPLE 7

0.5 kg of premix as described in Example 5 is admixed with a basal fodder to yield a total weight of 100 kg of the following composition:

| Components | Amounts, kg |
| --- | --- |
| Maize | 37.6 kg |
| Barley | 25.4 kg |
| Wheat | 6.0 kg |
| Oats | 5.0 kg |
| Soybean | 13.0 kg |
| Fish meal | 6.0 kg |
| Bran | 2.4 kg |
| Fat powder | 1.5 kg |
| Premix of minerals | 1.0 kg |
| Lime (fodder quality) | 1.0 kg |
| Sodium chloride (fodder quality) | 0.5 kg |
| Biolysine | 0.1 kg |
| Premix according to Example 5 | 0.5 kg |
| Total weight: | 100.0 kg |

The active-agent content of the resulting pig fodder is 0.005% by weight.

The composition of the premix of minerals is as follows:

| Components | Amounts, % by weight |
| --- | --- |
| Dicalcium phosphate | 55.0 |
| Monocalcium phosphate | 40.0 |
| Calcium carbonate | 5.0 |

EXAMPLE 8

0.5 kg of a premix as described in Example 6 is admixed with a basal fodder to yield a total weight of 100 kg of the following composition:

| Components | Amounts |
| --- | --- |
| Maize | 25.0 kg |
| Wheat | 34.0 kg |
| Extracted soybean | 18.0 kg |
| Milk powder | 9.9 kg |
| Fish meal | 4.0 kg |
| Yeast (fodder quality) | 2.0 kg |
| Fat powder | 3.4 kg |
| Premix of vitamins and trace elements according to Example 6 | 1.8 kg |
| Lime (fodder quality) | 1.0 kg |
| Sodium chloride (fodder quality) | 0.4 kg |
| Premix according to Example 6 | 0.5 kg |
| Total weight: | 100.0 kg |

The active agent content of the resulting piglet fodder is 0.005% by weight.

EXAMPLE 9

400 kg of a pre-ground soybean meal are filled into a mixer, 3.1 kg of soybean oil are added under stirring and the mixture is stirred until the solids get coated with oil. Thereafter 9.1 kg of an active agent according to Example 2 are added and the mixture is stirred until a homogeneous blend is obtained. Finally 9.0 kg of soybean oil are added, and the mixture is homogenized again.

EXAMPLE 10

0.5 kg of a active agent according to Example 2 are added to 10 kg of corn meal under stirring, and simultaneously propylene glycol is sprayed into the mixture. Thereafter 1.4 kg of dicalcium phosphate are added and the mixture is homogenized.

EXAMPLE 11

10 kg of alfalfa meal and 15 kg of a fiber-free lucerne fodder concentrate with high protein content are stirred for 20 hours, thereafter spraying of 1 kg of maize oil into the mixture is started with an even speed so that spraying is continued during the introduction of the following additional components: 2.5 kg of an active agent according to Example 1, 10 kg of maize starch, 0.3 kg of silicon dioxide, 0,6 kg of ascorbic acid, 9 kg of maize starch and 2.5 kg of the above active agent. The mixture thus obtained is stirred for additional 5 minutes.

EXAMPLE 12

One proceeds as described in Example 9 with the difference that 1,4-butyleneglycol is applied as wetting agent, instead of soybean oil.

EXAMPLE 13

A) 3.5 kg of potato starch are admixed with 2.9 kg of a active agent according to Example 2. 0.05 kg of mineral oil are sprayed into the mixture, thereafter 0.2 kg of sorbic acid, 0.4 kg of silicon dioxide and 0.1 kg of calcium propionate are added, and the mixture is stirred for additional 2 minutes.

B) 4.2 kg of fish meal are admixed with 22 kg of rye bran. 0.6 kg of mineral oil are sprayed into the mixture, thereafter 4 kg of a mixture prepared according to point A), 10 kg of maize meal, 4 kg of a mixture prepared according to point A) and 9 kg of maize meal are introduced under stirring. Finally 0.6 kg of mineral oil are sprayed into the mixture.

EXAMPLE 14

100 kg of wheat bran, 10 kg of an active agent according to Example 3, 2.5 kg of calcium carbonate, 0.15 kg of α-tocopherol and 0.4 kg of calcium propionate are homogenized with 4 kg of propyleneglycol.

EXAMPLE 15

10 kg of soybean meal and 0.6 kg of an active agent according to Example 3 are homogenized with 2.5 kg of 1,4-butyleneglycol.

EXAMPLE 16

50 kg of soybean meal, 6 kg of an active agent according to Example 4, 0.5 kg of silicon dioxide, 1.6 kg of soybean oil and 0.2 kg of calcium propionate are homogenized.

What we claim is:

1. A composition for use as feed additive, premix or ready-for-use fodder, comprising as active ingredient a compound of the formula (I),

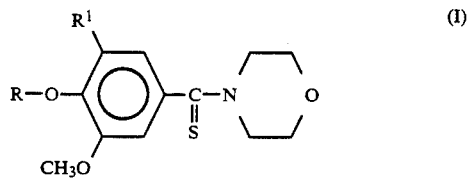

wherein
$R^1$ represents methoxy or hydrogen and R stands for methyl; or

R and $R^1$ denotes hydrogen; or $R^1$ stands or hydrogen and R represents ethyl, in an amount sufficient to exhibit a weight-gain increasing and fodder-utilization improving effect in an animal in need thereof in admixture with suitable inert solid or liquid carriers or diluents used in the production of fodders and fodder additives.

2. A composition as claimed in claim 1, comprising 4-(3',4',5'-trimethoxyphenyl)-thioxomethylmorpholine of the formula (V)

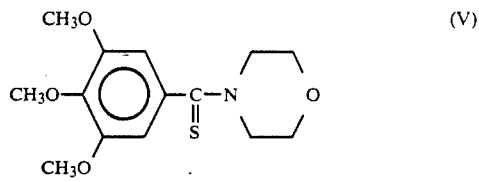

as active ingredient, in an amount sufficient to exhibit a weight-gain increasing and fodder-utilization improving 3. A composition as claimed in claim 1, comprising 4-(4'-hydroxy-3'-methoxyphenyl)thioxomethylmorpholine of formula (VI)

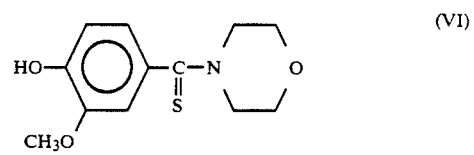

as active ingredient, in an amount sufficient to exhibit a weight-gain increasing and fodder-utilization improving effect in an animal in need thereof.

4. A composition as claimed in claim 1, comprising 4-(3',4'-dimethoxyphenyl)-thioxomethylmorpholine of the formula (VII) as active agent, in an amount sufficient to exhibit a weight-gain increasing an fodder-utilization improving effect in an animal in need thereof.

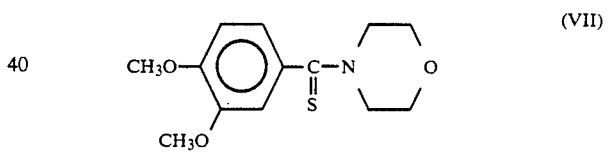

5. A composition as claimed in claim 1, comprising 4-(4'-ethoxy-3'-methoxyphenyl)-thioxomethylmorpholine of the Formula (VIII)

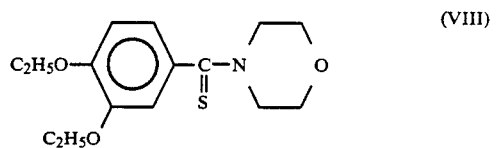

as active ingredient, in an amount sufficient to exhibit a weight-gain increasing and fodder-utilization improving effect in an animal in need thereof.

6. Composition as claimed in claim 1 comprising as carrier substances of vegetable or animal origin applicable in the feeding of animals, wheat, barley, bran, maize, soybean, oats, rye or alfalfa in the form of grits, groats or meal, furthermore fish meal, meat meal, skimmed milk powder or tapioca meal etc. or mixtures thereof.

7. A process for the preparation of composition according to claim 1, which comprises admixing a compound of the general Formula (I), wherein R and $R^1$ are as stated above, in an amount sufficient to exhibit a weight-gain increasing and fodder utilization improving effect in an animal in need thereof with suitable edible solid or liquid carriers or diluents and optionally with additives, generally used in the production of fodder additives and fodders.

8. A method of improving weight-gain and fodder utilization of animals, which comprises feeding the animals with a fodder or feed additive according to claim 1.

9. A composition as claimed in claim 2 comprising as carrier substances of vegetable or animal origin applicable in the feeding of animals, wheat, barley, bran, maize, soybean, oats, rye or alfalfa in the form of grits, groats or meal, furthermore fish meal, meat meal, skimmed milk powder or tapioca meal etc. or mixtures thereof.

10. A composition as claimed in claim 3 comprising as carrier substances of vegetable or animal origin applicable in the feeding of animals, wheat, barley, bran, maize, soybean, oats, rye or alfalfa in the form of grits, groats or meal, furthermore fish meal, meat meal, skimmed milk powder or tapioca meal etc. or mixtures thereof.

11. A composition as claimed in claim 4 comprising as carrier substances of vegetable or animal origin applicable in the feeding of animals, wheat, barley, bran, maize, soybean, oats, rye or alfalfa in the form of grits, groats or meal, furthermore fish meal, meat meal, skimmed milk powder or tapioca meal etc. or mixtures thereof.

12. A composition as claimed in claim 5 comprising as carrier substances of vegetable or animal origin applicable in the feeding of animals, wheat, barley, bran, maize, soybean, oats, rye or alfalfa in the form of grits, groats or meal, furthermore fish meal, meat meal, skimmed milk powder or tapioca meal etc. or mixtures thereof.

13. A process for the preparation of a composition according to claim 2, comprising admixing a compound of the formula (I), wherein R and $R^1$ are as stated above, in an amount sufficient to exhibit a weight-gain increasing and fodder-utilization improving effect in an animal in need thereof with suitable edible solid or liquid carriers or diluents and optionally with additives generally used in the production of fodder additives and fodders.

14. A process for the preparation of a composition according to claim 3, comprising admixing a compound of the formula (I), wherein R and $R^1$ are as stated above, in an amount sufficient to exhibit a weight-gain increasing and fodder-utilization improving effect in an animal in need thereof with suitable edible solid or liquid carriers or diluents and optionally with additives, generally used in the production of fodder additives and fodders.

15. A process for the preparation of a composition according to claim 4, comprising admixing a compound of the formula (I), wherein R and $R^1$ are as stated above, in an amount sufficient to exhibit a weight-gain increasing and fodder-utilization improving effect in an animal in need thereof with suitable edible solid or liquid carriers or diluents and optionally with additives, generally used in the production of fodder additives and fodders.

16. A process for the preparation of a composition according to claim 5, comprising admixing a compound of the formula (I), wherein R and $R^1$ are as stated above, in an amount sufficient to exhibit a weight-gain increasing and fodder-utilization improving effect in an animal in need thereof with suitable edible solid or liquid carriers or diluents and optionally with additives, generally used in the production of fodder additives and fodders.

17. A process for the preparation of a composition according to claim 6, comprising admixing a compound of the formula (I), wherein R and $R^1$ are as stated above, in an amount sufficient to exhibit a weight-gain increasing and fodder-utilization improving effect in an animal in need thereof with suitable edible solid or liquid carriers or diluents and optionally with additives, generally used in the production of fodder additives and fodders.

18. A method for improving weight-gain and fodder-utilization of animals, comprising feeding the animal with a fodder or feed-additive according to claim 2.

19. A method for improving weight-gain and fodder-utilization of animals, comprising feeding the animal with a fodder or feed-additive according to claim 3.

20. A method for improving weight-gain and fodder-utilization of animals, comprising feeding the animal with a fodder or feed-additive according to claim 4.

21. A method for improving weight-gain and fodder-utilization of animals, comprising feeding the animal with a fodder or feed-additive according to claim 5.

22. A method of increasing the weight gain and improving the feed utilization of a domestic animal comprising feeding to said animal a composition as defined in claim 1 wherein a compound of Formula I is present in said composition in an amount sufficient to exhibit a weight-gain increasing and fodder-utilization improving effect in said animal in need thereof.

* * * * *